United States Patent
Lacquaniti et al.

[11] Patent Number: 5,746,141
[45] Date of Patent: May 5, 1998

[54] HIGH TEMPERATURE ACID GASES AND PARTICULATE REMOVAL IN WASTE INCINERATION PROCESS

[75] Inventors: Luigi Lacquaniti; Giuseppe Liuzzo; Marcello Palitto; Nicola Verdone, all of Rome, Italy

[73] Assignee: Consorzio Obbligatorio Nazionale Per Il Riciclaggio Dei Contenitori in Plastica Per Liquidi, Rome, Italy

[21] Appl. No.: 776,199
[22] PCT Filed: Oct. 6, 1995
[86] PCT No.: PCT/IT95/00163
    § 371 Date: Jan. 30, 1997
    § 102(e) Date: Jan. 30, 1997
[87] PCT Pub. No.: WO96/29540
    PCT Pub. Date: Sep. 26, 1996
[51] Int. Cl.$^6$ ..................... F23J 15/00
[52] U.S. Cl. ............ 110/203; 110/216; 110/204; 110/210
[58] Field of Search ............... 110/216, 245, 110/203, 204, 210, 346

[56] References Cited

U.S. PATENT DOCUMENTS

| | | | |
|---|---|---|---|
| 3,722,433 | 3/1973 | Kramer | 110/8 R |
| 4,091,747 | 5/1978 | Chase | 110/210 |
| 4,284,015 | 8/1981 | Dickinson | 110/347 |
| 4,355,601 | 10/1982 | Hattiangadi | 122/4 D |
| 4,376,373 | 3/1983 | Weber et al. | 60/648 |
| 4,590,868 | 5/1986 | Ishihara | 110/347 |
| 4,620,492 | 11/1986 | Vogg et al. | 110/345 |
| 4,860,670 | 8/1989 | Jorgensen | 110/215 |
| 4,958,578 | 9/1990 | Houser | 110/246 |
| 5,241,916 | 9/1993 | Martin | 110/348 |
| 5,345,884 | 9/1994 | Vandycke et al. | 110/345 |
| 5,425,316 | 6/1995 | Malone | 110/190 |
| 5,553,555 | 9/1996 | Gosselin, Jr. et al. | 110/215 |
| 5,632,211 | 5/1997 | Okuno et al. | 110/235 |

*Primary Examiner*—Ira S. Lazarus
*Assistant Examiner*—Nhat-Hang H. Lam
*Attorney, Agent, or Firm*—Oblon, Spivak, McClelland, Maier & Neustadt, P.C.

[57] ABSTRACT

A process of waste incineration, with heat recovery and reduced emissions of acid gases and particulate comprising a reduction of acid gases and particulate by mixing recirculating low temperature flue gases flowing out from the heat recovery section, with high temperature flue gases obtained from incineration. Said mixed flue gases are subjected, prior to heat recovery, to particulate separation. Moreover, the low temperature flue gases may be deacidified. Preferably, the reduction is enhanced by reacting the high temperature flue gases, mixed with a cold flue gas recirculation stream drawn downstream the heat recovery section, with an alkaline reagent, in order to eliminate the acidic gases. A waste incinerator is disclosed, which is combined with an acid gases and particulate removal plant, which is provided between the incinerator itself (2, 6) and the boiler (7).

18 Claims, 3 Drawing Sheets

HIGH TEMPERATURE ACID GASES AND PARTICULATE REMOVAL IN WASTE INCINERATION PROCESS

TECHNICAL FIELD

The present invention relates to a process of waste incineration with acid gases and particulate removal upstream the thermal recovery section for production of electric and/or mechanical energy, and moreover it relates to an incinerator used for this process.

BACKGROUND ART

It is known that the flue gases resulting from the present waste disposal processes involving thermal treatment are characterized by high values of acid and particulate content.

In detail, the content of hydrochloric acid in the gas phase and of chlorides in the particulate is high in municipal solid wastes (MSW), in hospital solid wastes incineration and in special waste incineration, according to the chlorine content of the material subjected to thermal treatment.

This implies, in the current incineration processes with heat recovery from flue gases before their discharge to the atmosphere, serious design and operating difficulties for the plants due to corrosion, especially with regard to the boiler's metallic heat transfer surfaces and to the different structural and connecting parts. As a result, in the above mentioned plants the investment cost rises, if special materials are used, or, on the other hand, an increase in operating costs ensues, due to frequent shut down operations and repair of the damaged parts, or, more usually, both situations occur.

Furthermore, the above mentioned corrosion phenomena occur more rapidly the higher the temperature of the metallic heat transfer surfaces.

The steam produced by heat recovery can be expanded in a turboalternator device, and the efficiency of the operation increases with steam temperature and pressure. In practice, in order to reduce corrosion phenomena, it is necessary to limit the superheating temperature of the steam to rather low values (usually between 320° and 380° C.), whereas in high efficiency thermal power plants, operated with conventional fuels, the superheating temperature of the steam is usually in the range between 450° C. and 540° C.

Therefore a compromise solution is usually adopted taking into account the opposite requirements of corrosion phenomena reduction and of turboalternator efficiency increase. This compromise limits the performance and service availability of the incinerators operating nowadays.

Another aspect to be considered is that concerning the environmental effects due to waste incineration plants. The discharge of flue gases from incineration plants is subjected to rules (indicated by European Community directions or imposed by national or local Authorities) which set the maximum allowable content of pollutants or micropollutants. In Table 1 the limits in force nowadays for some of them are shown:

TABLE 1

|  |  | EEC | ITALY (*) |
|---|---|---|---|
| particulate | [mg/Nmc] | 20 | 30 |
| HCL | [mg/Nmc] | 50 | 50 |
| SO$_2$ | [mg/Nmc] | 300 | 300 |
| NO$_2$ | [mg/Nmc] | — | 300 |
| PCDDs + PCDFs | [ng/Nmc] | 0.1. | 4000 |

(*) (existing plants)

Among these substances, dangerous micropollutants, such as organic chlorinated substances, like dioxins and furans (PCDDs and PCDFs) are produced by the synthesis "de novo" according to Stieglitz and Vogg, (Chemosphere Vol. 16 N. 8/9 1987) in the cooling of flue gases generated by waste incineration. This synthesis can occur on the heat exchange surfaces of the boiler starting from soot or from other constituents of flying ashes and from HCl or others chlorine compounds.

In order to comply with these restrictive rules whose purpose is the environmental protection, according to some known incineration processes the reduction of acid gases is accomplished by the reaction of the flue gases with an alkaline reagent, by means of the well known dry, semi-dry or wet processes, downstream the flue gases cooling section. These process cannot avoid the high temperature corrosion phenomena on the boiler heat transfer surfaces. As an example the paper of K. T. Fellows and M. J. Pilat (J. Air Waste Manage. Assoc.; Vol. 40 No. 6, 1990) deals with the use of sodium bicarbonate at low temperature, near 200° C., in order to absorb hydrochloric acid. However, even if the effectiveness of sodium bicarbonate as an alkaline reagent for neutralising hydrochloric acid at low temperature has been ascertained, as described in what follows, said flue gases treatment is not useful to solve the problems arising from corrosion phenomena.

In other known processes of incineration with heat recovery, it has been attempted to reduce the acid gases in the combustion chamber through the use of alkaline sorbents, employed especially in fluidized bed combustion plants. Such processes generally lead to results which are not adequate for the limitations enforced by law.

An example of what reported is the study of A. Herbert, DCE France S.A. (1989), which relates to the filtration of waste incineration flue gases, at high temperature and after injection of hydrated lime. The HCl achievable removal at the combustion temperatures (800°–1000° C.) is very poor: on one hand it cannot produce useful effects on boiler corrosion protection, on the other hand cannot assure the discharged flue gas complies with the low emission limits required as far as HCl content is concerned; such considerations are based on the thermodynamic study illustrated in FIG. 2. A second example shows a further drawback in the direct injection of sorbents in the combustion chamber (pilot plant study of fluidized bed incineration process, by D. L. Ziegler, A. J. Johnson, L. J. Meile, A. L. Johnston and E. L. Shamhart, NTIS Report No. RFP-2271. 1974). Sodium carbonate is added in the combustion chamber in order to remove HCl. At the combustion chamber temperature, the salt used and the reaction products, i.e. sodium carbonate and sodium chloride, are melted. This fact can cause heavy corrosion and erosion problems by entrained particles on the boiler metallic surface.

This approach differs from the process according to the present invention, as will be seen below.

DISCLOSURE OF INVENTION

The main object of the present invention is to solve the problems related to the presence of acid gases solid particulate in the flue gases resulting from the thermal treatment of solid wastes, and in particular those problems not solved in known processes of incineration and heat recovery. In detail, an important object is to lower the temperature of the flue gases which come in contact with the heat transfer surfaces of a boiler acting as a thermal source for a turbogenerator system, in order to reduce the corrosion phenomena whose effect increases with the gas temperature. However, this temperature reduction must not cause a decrease of the system efficiency, which would be associated with fresh air addition or water spraying.

Another object is the corrosion phenomena reduction obtaining lowering the concentration of acid gases and of particulate matter in the flue gases entering the boiler.

A further object of the present invention is to reduce the emission of pollutants to the atmosphere below the admissible values, and to substantially eliminate the production of other particularly harmful substances (micro-pollutants like organic chlorinated substances).

Therefore, according to a first feature, the present invention provides a waste incineration process with elimination of acid gases and particulate upstream the heat recovery section, the incinerating process consisting of the heat incineration section, including waste combustion and a possible afterburning stage, the heat recovery from the flue gases at a reduced temperature, in order to obtain electric and/or mechanical energy and the lowering of the acid gas particulate concentration in the flue gases. Said process comprises according to a first embodiment, a reduction of the temperature and of particulate concentration, obtained by recirculating and mixing low temperature flue gases originating from said heat recovery section, with high temperature flue gases coming from the combustion chamber. The mixed high and low temperature flue gases are subjected before heat recovery therefrom, to solid particulate separation in suitable devices.

The same process of the present invention, according to a second embodiment additionally comprises the feature that said low temperature flue gases, before mixing with said high temperature fumes, are subjected to deacidification, thereby reducing the acid gases concentration in the flue gases at the inlet to the heat recovery section.

In a preferred embodiment of the process of the present invention, the reduction of acid gases and particulate concentration is further improved, by reacting the high temperature flue gases obtained through incineration and mixed with the re-circulated low temperature gases, with an alkaline reagent, and eliminating the particulate by means of a suitable device.

Preferred alkaline reagents are sodium compounds. According to a second feature, the present invention provides a waste incinerator combined with an acid gas and particulate concentration reduction plant and associated with a steam operated turboalternator, including the incinerator itself which comprises a furnace with an afterburning chamber, if required, a heat recovery boiler, a steam turboalternator with said boiler as thermal source, and an acid gases and particulate concentration reduction plant; said acid gases and particulate concentration reduction plant is provided between said incinerator itself and said boiler, and comprises a section of mixing of the high temperature fumes from the incinerator with the low temperature fumes recycled from the boiler outlet, a neutralisation reactor of the flue gases flowing out the mixing section, located upstream said boiler, a fume main flow recirculation fan for the flue gases flowing out of said boiler, an alkaline reagents tank, a metering device of said alkaline reagents, a supply device of said alkaline reagents to said neutralization reactor, a particulate separator to remove particulate from the flue gases flowing out of said neutralization reactor arranged upstream said boiler. The advantages of the incineration process according to the invention are the following:

A reduction of the plant investment cost, cause of the possibility to manufacture the boiler heat transfer surfaces, for heat recovery from the flue gases, by means of usual, i.e. less expensive materials, due to the moderate residual chemical reactivity of the flue gases flowing into the boiler; superheating of the steam produced inside the boiler, up to temperatures which are much higher than those employed at present, thereby increasing the electric energy production efficiency from the present value of 18–24% of known plants, to values of about 30–35% and more;

a reduction of the amount of discharged flue gases, because of the possibility of using less excess of air, since the adjustment of the temperature of the flue gases flowing into the boiler is carried out by recirculation;

a smaller amount of micropollutants like chlorinated organic substances, which are produced during cooling of the flue gases, according to the process discovered by Stieglitz and Vogg, because of the treatment to which said flue gases are subjected before they flow into the boiler.

BRIEF DESCRIPTION OF DRAWINGS

The invention will be more easily understood by reading the following description referring to the annexed drawings, wherein.

BEST MODE OF CARRYING OUT THE INVENTION

Figure 1:
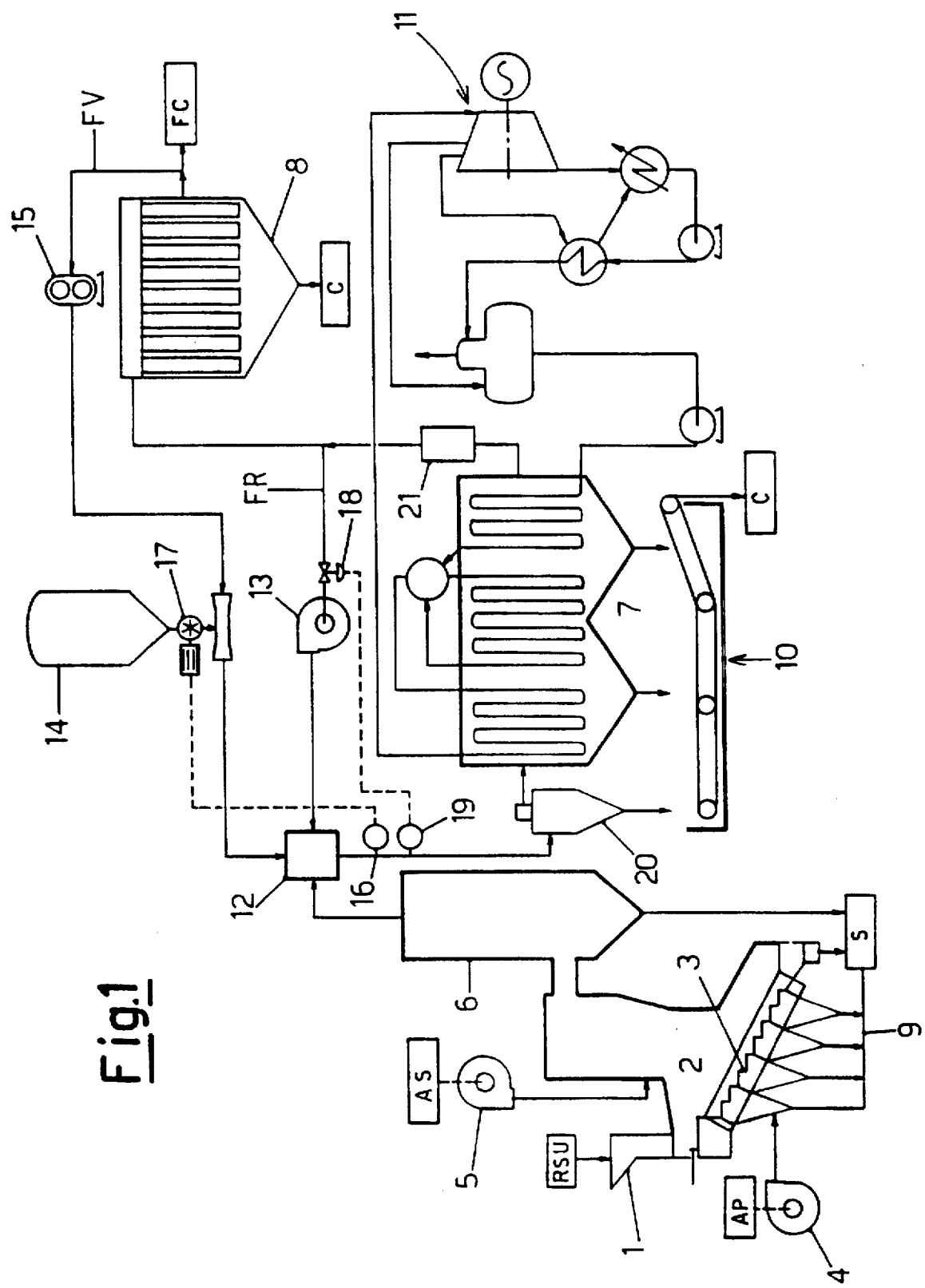
FIG. 1 is a process flow scheme of a waste incinerator, which operates according to the present invention.

In the Figures, 1 denotes a waste feeder (e.g. municipal solid waste), 2 denotes a furnace comprising a furnace bottom and the associated combustion chamber 3, which is supplied from below by a plant 4 for primary air supply AP, and from above, by a plant 5 for secondary air supply AS, by 6 it is indicated an afterburning chamber; by 7 a heat recovery boiler, from which the flue gases to be fed to a cleaning bag filter 8 flow out. Below the furnace 2 and afterburning chamber 6, there is a device 9 for the removal of the slag S, whilst below the heat recovery boiler 7 and bag filter 8 there is an ash C removal apparatus 10.

In FIG. 1,11 generally denotes a steam turbo-alternator not described in detail and combined with said incinerator, to which it is operatively connected through the heat recovery boiler 7.

The first embodiment of the process according to the present invention allows a lowering of the fumes temperature at the inlet to the boiler 7 and a reduction of the solid particulate concentration in said fumes, by mixing inside a neutralisation reactor 12 the flue gases flowing out of the afterburning chamber with a low temperature flue gases stream FR flowing out of the boiler 7 and supplied by a fan 13. The flow rate of the flue gases FR is adjusted by a valve 18 arranged upstream the fan 13 and controlled by a temperature regulator 19 located downstream the reactor 12.

The low and high temperature flue gases mixed with each other are subjected, before the inlet of the boiler 7, to filtration, to separate the substances in the form of particulate, inside a separator denoted by 20 in FIG. 1.

In a second embodiment of the process of the present invention, the low temperature flue gases flowing out of the boiler 7 are deacidified inside the deacidifying device 21, before they are mixed with the high temperature flue gases, in the reactor 12. In this way it is possible to reduce by about 50% the HCl concentration of the fumes flowing into the boiler. In the preferred embodiment of the process according to the invention, the reduction of the acid gases and particulate concentration is further enhanced by reacting, inside the reactor 12, the high temperature flue gases out of the afterburning chamber 6, which are mixed with the stream FR of recirculated flue gases, with an appropriate reagent such as an alkaline or alkaline-earth metal based reagent.

A solid compound, preferably an alkaline compound, as will be seen afterwards, and having a sufficiently fine grain size, is put in contact with the flue gases flowing from the afterburning chamber 6 and with the recirculated flues, inside at least one neutralisation reactor 12.

The solid compound which constitutes an alkaline reagent, is supplied from a storage silo 14 and is transported by means of the flue gases FV as a carrier, which are diverted from the flue gases FC supplied to the chimney and cleaned like the latter by the bag filter 8. The flue gases FV are moved by a blower device 15.

In this case also, the contact temperature is adjusted by the recirculation of part of the flue gases FR flowing out of the heat recovery boiler 7, using the recirculation fan 13.

The metering of the reagent is carried out employing a HCl sensor 16 which is arranged downstream the reactor 12 and controls a metering device 17 of the storage silo 14.

The temperature of the reactor 12 is adjusted by the temperature controller 19 and the valve 18 which modulates the flow rate upstream of the recirculation fan 13.

Alternatively, the alkaline reagent may be dissolved in a solution or dispersed in a liquid suspension. In this case, instead of the storage silo 14 there will be provided a tank and the metering device 17 will be a pump.

It is possible to obtain acid gas content reduction at various residual values depending on the quantity of the recirculated flue gases, and therefore on the operation temperature of the neutralisation reactor 12, and depending on the alkali or alkali-earth metal of which the compound used as a reagent is formed, but also according to the goodness of the gas-solid contact.

Figure 2:
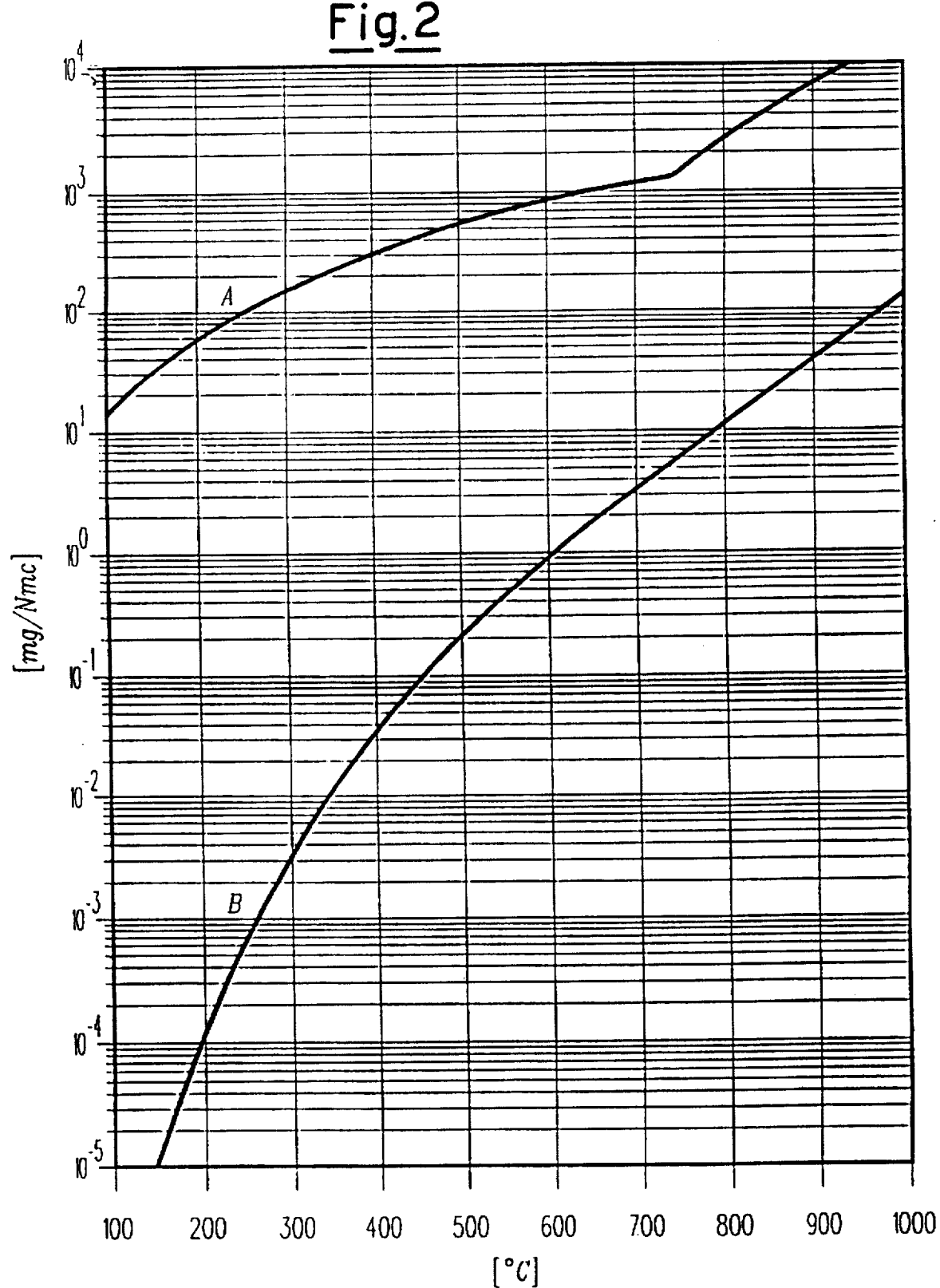
FIG. 2 is a plot of the equilibrium HCl pressure, above a mixture of sodium bicarbonate and chloride in an atmosphere constituted by a typical flue gas composition, wherein the ordinate referes to the values of the HCl concentration in mg/Nmc, and the abscissa to the prevailing temperature in °C.

In particular, the inventors came through their studies to theoretical conclusions summarized in the diagram of FIG. 2, in which A denotes an equilibrium curve of HCl containing flue gases over alkaline compounds of Ca, such as $CaCl_2$, CaO, $CaCO_3$, $Ca(OH)_2$ and B denotes an equilibrium curve of flue gases and alkaline compounds of Na, like $Na_2CO_3$, and $NaHCO_3$. From the equilibrium diagram it follows that the limit concentrations of HCl obtainable through dosage of sodium based sorbents is much lower than that obtainable with calcium based compounds. For example, at a temperature of 700° C., the limit concentration of HCl with a Na-based alkaline reagent, is 3,32 mg/Nmc, whereas for a Ca-based reagent it is 1173,12 mg/Nmc. Downstream of the neutralization reactor 12 is furthermore provided a separator 20, for instance a cyclone or multicyclone (centrifugal dust separator), through which the particulate is separated and conveyed on the ash C removal conveyor 10 of the heat recovery boiler 7.

As already mentioned, the reduction level of the acid components depends on the specific alkaline reagent used and on the operative conditions employed for carrying out the neutralization reactions.

Therefore, the choice of:
the reagent
the operation temperature
the contact conditions (gas-solid or gas-liquid) plays a fundamental role, in the above order. From the thermodynamic point of view it can be stated that the various utilizable alkaline reagents have a qualitatively similar but quantitatively different behaviour, so that for each of them it is possible to determine the maximum obtainable reduction, quantity which is an inverse function of temperature thereof.

That means increasing the temperature the values of residual acid in the gas become noticeably larger. This type of analysis puts in evidence (see FIG. 2) the remarkable superiority of alkali metal compounds (Li, Na, K, Rb, Cs) with respect to analogous compounds of alkaline-earth substances in particular of Ca which presently is the most commonly used. The reaction rate, i.e. the approaching rapidity to thermodynamic equilibrium, is on the other hand a direct function of temperature.

Figure 3:
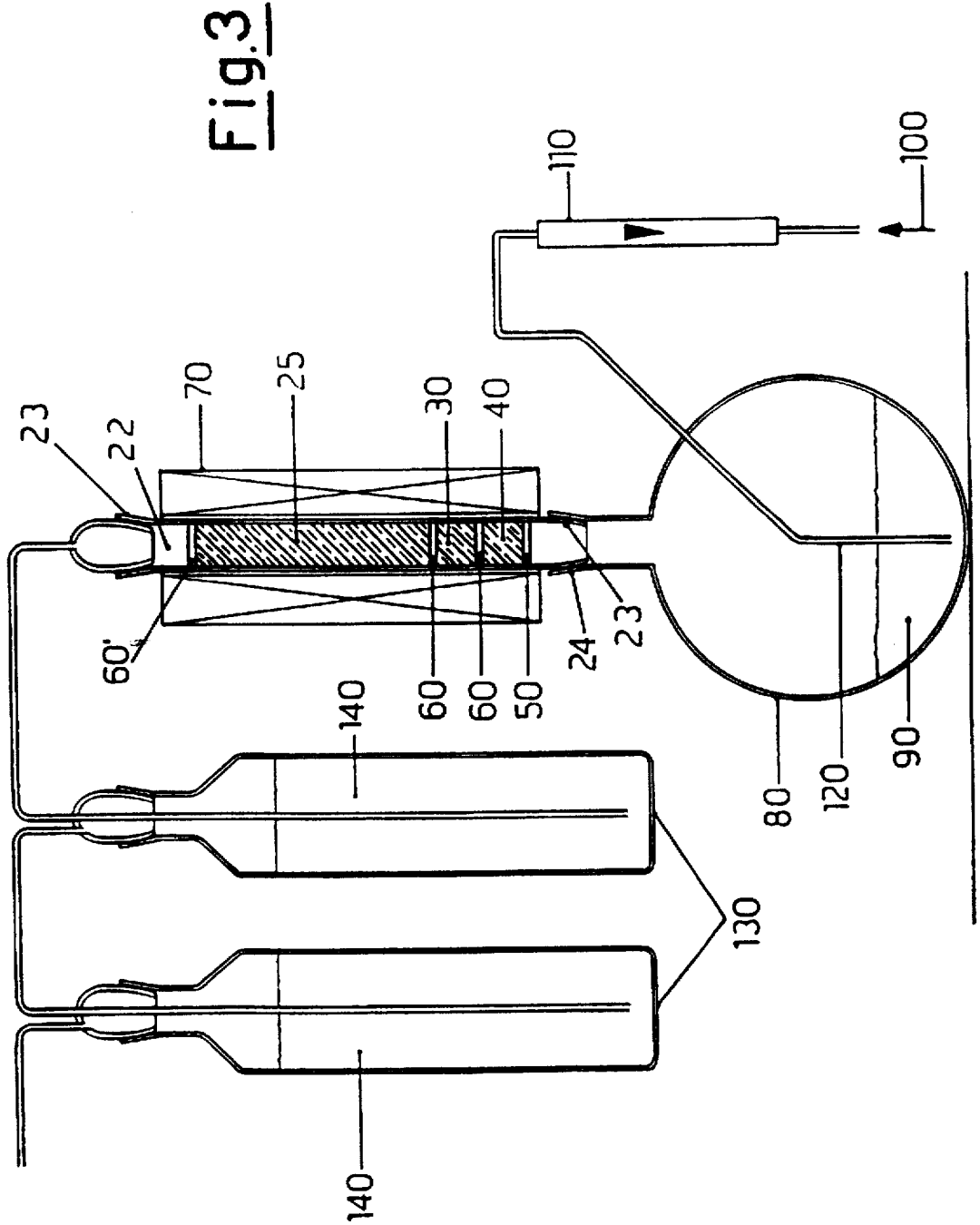
FIG. 3 is a schematic view of an experimental device for separating an acid gas, giving evidence of the validity of the theoretical results obtained by the authors of the present invention.

These theoretical results obtained by the inventors, which led to tracing of the curves A and B of the diagram in FIG. 2, have been experimentally verified. The experiment has been carried out in the testing device shown in FIG. 3, which comprises:

a quartz tube 22 with an inner diameter of 20 mm, total length of 200 mm, provided at its bottom with a porous sector 50 of sintered quartz and with conical grinded connection parts 23,23 at its ends;

a bulb of pyrex glass 80 having a tube 120 for gas bubbling through ending near its bottom, and a grinded conical connection part 24 at the upper end of the bulb itself;

a flowmeter 110 for measuring the flow rate of nitrogen gas 100 supplied to the bulb 80;

a cylindrical electric furnace 70 heating the quartz tube 22 to a predetermined temperature;

two bubbling through traps 130 connected in series and communicating with the upper end of tube 22, which are filled with an alkaline reagent 140 comprising a sodium hydroxyde solution (NaOH) at a concentration of 1M, for the elimination of acid gases.

The described experimental apparatus was employed in a series of test-runs, one of which is herebelow reported as a proof of the effectiveness of the acid removal method which the present invention is based on.

The experiment was carried out as follows:

a mixture of sodium carbonate ($Na_2CO_3$) and an inert material (small quartz spheres) was prepared, in amounts of 10 g sodium carbonate for 50 g of small quartz beads.

The mixture was introduced in the tube 22 until a first layer 40 of 22 mm of height was formed. Thereafter, a thin layer 60 (about 5 mm) of quartz wool was introduced on the upper surface of the mixture layer 40. In a similar way, a second layer 30 and a third layer 25 of said mixture were formed by interposition of a quartz wool layer 60 between the two layers. The height of the second layer 30 and of the third layer 25 were respectively equal to 22 mm and 169 mm. At the upper surface of the third layer 25, a layer 60' of about 5 mm of height of small quartz beads was applied.

296,4 g of an aqueous solution 90 of hydrochloric acid (HCl) with 36% by weight of HCl were introduced in the bulb 80.

In each trap 130, 100 cc of a sodium-hydroxide (NaOH) solution 140 with a concentration of 1M were introduced.

The temperature of the tube 22 and of its content was raised to 700° C. by means of the furnace 70.

Nitrogen gas ($N_2$) under pressure was taken from a bottle provided with a pressure reducing valve and was sent through the flowmeter 110 causing bubbling through the HCl solution 90. The flow rate of the nitrogen stream was 24±1 cc/min.

The flow continued for two hours. The temperature of the solution 90 reached the equilibrium value of about 21° C. after a few minutes (measured by a thermometer, not shown in FIG. 3).

After stopping of the gas flow the device was disassembled. After cooling by exposure to the air the tube 22 was emptied and the contents of the layers 25,30 and 40 were collected separately. The analysis of the chlorine (Cl) amount in these three layers gave the result reported in the following Table 2.

TABLE 2

| layer | Cl moles | Cl in g |
|---|---|---|
| 25 | 0.0010 | 0.0350 |
| 30 | 0.0089 | 0.3115 |
| 40 | 0.0102 | 0.3570 |
| Total | | 0.7035 |

Since the solution 90 at the test temperature (21° C.) is characterized by a vapour pressure of HCl of 108 mm Hg, the bubbling through of a nitrogen 100 flow rate equal to 24±1 cc/min for a period of two hours produces vaporization of 0.73 g of HCl, with chlorine content equal to 0.71 g. This quantity is very close to the total chlorine determined by the analysis and contained in the tube 22.

As a further evidence of almost total retaining of chlorine by the above described mixture, an analytic determination of the chlorine contained in the traps 130 was made at the end of the experiment. This determination showed chlorine traces which could not be measured by conventional methods (precipitation with a solution having a known titer of silver nitrate and counter-titration with potassium thiocyanate). These results confirms what can be evaluated from the curve B of FIG. 2, which allows to estimate a minimal concentration of 3.5 mg/Nmc of chlorine flowing out of the tube 22 corresponding to a chlorine amount of 0.009 g, under the conditions of the above described experiment.

The so conceived invention is susceptible of modifications and variants, which are all within the scope of the same inventive concept. For example, it is possible to realize a variant of the process, which allows the inlet of an alkaline reagent, partly downstream the fan 13 and partly in the reactor 12, thereby obtaining equally satisfying results. Moreover, all details may be replaced by technically equivalent elements.

We claim:

1. A process of waste incineration, comprising:

incinerating waste, including combustion and afterburning of said waste, in an incinerator;

removing acid gases and particulate upstream of a heat recovery section:

cooling flue gases; and reducing particulate concentration in said gases: removing said particulate and subsequently recovering heat therefrom for the production of electric or mechanical energy wherein said cooling of the flue gases and said reducing of particulate concentration is obtained by recirculating and mixing low temperature flue gases flowing out of a heat recovery section with high temperature flue gases from said flue gas exit of the incinerator: and wherein said acid gases and particulate are removed at a temperature lower than the temperature prevailing in a flue gas exit of the incinerator.

2. A process according to claim 1, characterized in that said low temperature flue gases and said high temperature flue gases mixed together, are subjected to a separation of the particulate carried by a mixture of said low temperature flue gases and high temperature flue gases, before heat recovery.

3. A process according to claim 1, characterized in that said low temperature flue gases are subjected to deacidification before being mixed with said high temperature flue gases.

4. A process according to claim 1, characterized in that said removing of acid gases and particulate are further enhanced by reacting said high temperature flue gases obtained by the incineration, and mixed with the recirculated low temperature flue gases, with an alkaline reagent.

5. A process according to claim 4, characterized in that as a carrier of the alkaline reagent, a reduced amount of low temperature flue gases separated from the low temperature which are directed to an emission duct communicating with the atmosphere, is employed, said low temperature flue gases being previously filtered.

6. A process according to claim 4 characterized in that said alkaline reagent is a sodium compound.

7. A process according to claim 6, characterized in that said alkaline reagent is sodium carbonate or bicarbonate.

8. A process according to claim 4, characterized in that said alkaline reagent is a powder.

9. A process according to claim 4, characterized in that said alkaline reagent forms a solution.

10. A process according to claim 4, characterized in that said alkaline reagent is suspended in a liquid suspension.

11. A waste incinerator combined with an acid gases and particulate emission reduction plant and associated with a steam turboalternator (11), comprising the waste incinerator itself including a furnace (2), a heat recovery boiler (7), a steam turboalternator (11) having as a thermal source said heat recovery boiler (7), and an acid gases and particulate emission reduction plant, wherein said acid gases and particulate emission reduction plant is provided between the waste incinerator itself (2,6) and said heat recovery boiler (7) and includes:

a neutralization reactor (12) of high temperature flue gases flowing out of the incinerator itself, which is arranged upstream of the boiler (7), a recirculation fan (13) for conveying to said neutralization reactor (12) a primary part (FR) of the low temperature flue gases flowing out of said heat recovery boiler (7), an alkaline reagents containing vessel (14), a metering device (17) of alkaline reagents;

a blower device (15) of a gas carrying said alkaline reagents inside said neutralization reactor (12), a separator (20) of a particulate from flue gases flowing out of said neutralization reactor (12), which is provided upstream of said boiler (7).

12. An incinerator according to claim 11, further comprising a deacidification device (21) of the low temperature flue gases provided downstream said heat recovery boiler (7).

13. An incinerator according to claim 11, characterized in that upstream said recirculation fan a valve is provided, which is modulated by a temperature controller arranged downstream said neutralization reactor.

14. An incinerator according to claim 11, characterized in that upstream said blower device a bag filter is provided.

15. The waste incinerator according to claim 11, characterized in that downstream said neutralization reactor (12) is provided an acid gas concentration sensor, measuring an acid gas concentration in flue gases and controlling said metering device (17).

16. An incinerator according to claim 11, characterized in that said alkaline reagents containing vessel for alkaline reagents is a storage bin for powdery substances.

17. The waste incinerator according to claim 11, characterized in that said alkaline reagents containing vessel for alkaline reagents is a storage tank for solutions or liquid suspensions.

18. The waste incinerator of claim 11, further comprising an afterburning chamber (6).

* * * * *